124,760

UNITED STATES PATENT OFFICE.

HENRY A. REAMS, OF DURHAM, NORTH CAROLINA.

IMPROVEMENT IN COMPOSITIONS FOR BLACKING AND POLISHING BOOTS AND SHOES.

Specification forming part of Letters Patent No. 124,760, dated March 19, 1872.

*To whom it may concern:*

Be it known that I, HENRY A. REAMS, of the town of Durham, county of Orange and State of North Carolina, have invented a certain new and useful composition of matter for use as a blacking, and which I denominate "Durham Boot and Shoe Blacking;" and the following is a full and exact description thereof, sufficient to enable those skilled in the art to make and use the same.

The nature of my invention consists in the compounding together of neats-foot oil with other ingredients, in the manner hereinafter set forth, so that, in addition to its polishing qualities, the composition tends to soften and preserve, being at the same time a polish, softener, and preservative for the leather.

To prepare the composition I take of neats-foot oil, one-half gallon; ivory-black, twenty pounds; pure vinegar, one-half gallon; sulphuric acid, five pounds; molasses, two gallons. These I place in a wooden vessel, stirring and mixing well and thoroughly with a wooden paddle, and until all the ingredients are dissolved or incorporated together. I then let the mixture stand for about twelve hours in an open vessel. By this time it has become somewhat solidified. I then beat it well with pestles for about two hours, when the composition will be ready for use.

In addition to the advantages herein set forth, it possesses the additional one of giving a beautiful polish when applied directly to a freshly-oiled surface.

What I claim, and desire to secure by Letters Patent, is—

The composition for blacking herein described, compounded of the materials and substantially in the proportions set forth.

HENRY A. REAMS.

Witnesses:
    JOSEPH H. ALLEN,
    JULIAN SLAU.